United States Patent
Jaconelli et al.

(10) Patent No.: US 8,636,300 B2
(45) Date of Patent: Jan. 28, 2014

(54) ATTACHMENT BRACKET AND FASTENING DEVICE FOR FASTENING AN AIRBAG TO A VEHICLE STRUCTURE

(75) Inventors: Håkan Jaconelli, Alingsås (SE); Börje Jakobsson, Brämhult (SE); Jack Kroll, Tollered (SE); Ola Henriksson, Vårgårda (SE); Stefan Andersson, Alingsås (SE)

(73) Assignee: Autoliv Development AB, Vargarda (SE)

( * ) Notice: Subject to any disclaimer, the term of this patent is extended or adjusted under 35 U.S.C. 154(b) by 146 days.

(21) Appl. No.: 13/254,197

(22) PCT Filed: Feb. 18, 2010

(86) PCT No.: PCT/EP2010/001002
§ 371 (c)(1),
(2), (4) Date: Sep. 1, 2011

(87) PCT Pub. No.: WO2010/099871
PCT Pub. Date: Sep. 10, 2010

(65) Prior Publication Data
US 2011/0316260 A1   Dec. 29, 2011

(30) Foreign Application Priority Data
Mar. 6, 2009  (DE) .......................... 10 2009 011 481

(51) Int. Cl.
*B60R 21/20*  (2011.01)
(52) U.S. Cl.
USPC .................. 280/728.2; 280/728.1; 280/730.2
(58) Field of Classification Search
USPC ........... 280/728.1, 728.2, 730.2; 24/289, 458; 248/222.11, 225.11
See application file for complete search history.

(56) References Cited

U.S. PATENT DOCUMENTS 6,422,588 B2 * 7/2002 Hieber et al. .............. 280/728.1
6,540,251 B1 * 4/2003 LeVey et al. ............... 280/728.2
(Continued)

FOREIGN PATENT DOCUMENTS

| DE | 102007007781 A1 | 8/2008 |
| EP | 1502824 A1 | 2/2005 |
| EP | 1837252 A1 | 9/2007 |

OTHER PUBLICATIONS

International Search Report and Written Opinion of the ISA for PCT/EP2010/001002, ISA/EP, Rijswijk, NL, mailed Jun. 10, 2010.

*Primary Examiner* — Drew Brown
*Assistant Examiner* — Barry Gooden, Jr.
(74) *Attorney, Agent, or Firm* — Harness, Dickey & Pierce, P.L.C.

(57) ABSTRACT

An attachment bracket for fastening an airbag to a vehicle structure includes an opening into which a strap connected to the airbag can be inserted, and a clamping surface provided for resting against the vehicle structure. The attachment bracket is formed from at least a first layer forming the clamping surface and a second layer spaced from the first layer in a spring elastic manner. The first and the second layers can be located on the same side of the vehicle structure. The attachment bracket can be fastened to the vehicle structure by a fastening means. The distance between the first and the second layer can be reduced by fastening the attachment bracket with the fastening means. A clamping force acting between the first layer and the vehicle structure can be generated by reducing the distance.

18 Claims, 7 Drawing Sheets

(56) References Cited

U.S. PATENT DOCUMENTS

| | | | |
|---|---|---|---|
| 6,705,635 B2* | 3/2004 | Hoeft et al. | 280/728.2 |
| 6,851,702 B2* | 2/2005 | Henderson et al. | 280/728.2 |
| 7,523,958 B2* | 4/2009 | Jang et al. | 280/730.2 |
| 7,669,883 B2* | 3/2010 | Giddings et al. | 280/728.2 |
| 7,735,855 B2* | 6/2010 | Jang et al. | 280/728.2 |
| 7,887,086 B2* | 2/2011 | Kalandek | 280/728.2 |
| 8,136,833 B2* | 3/2012 | Baumgartner | 280/728.2 |
| 8,201,848 B2* | 6/2012 | Baumgartner et al. | 280/728.2 |
| 8,220,825 B2* | 7/2012 | Bonarens et al. | 280/728.2 |
| 2003/0042712 A1* | 3/2003 | Henderson et al. | 280/728.2 |
| 2003/0222435 A1* | 12/2003 | Schmidt et al. | 280/728.2 |
| 2005/0029778 A1* | 2/2005 | Weber et al. | 280/728.2 |
| 2006/0192368 A1* | 8/2006 | Hall et al. | 280/730.2 |
| 2006/0237950 A1 | 10/2006 | Worrell | |
| 2006/0255568 A1* | 11/2006 | Demel et al. | 280/728.2 |
| 2007/0024031 A1* | 2/2007 | Coleman | 280/728.2 |
| 2007/0045999 A1* | 3/2007 | Saberan et al. | 280/730.2 |
| 2007/0241539 A1 | 10/2007 | Jang et al. | |
| 2007/0273128 A1 | 11/2007 | Cheal | |
| 2008/0238046 A1* | 10/2008 | Giddings et al. | 280/728.2 |
| 2008/0284141 A1 | 11/2008 | Jang et al. | |
| 2009/0020986 A1* | 1/2009 | Baumgartner et al. | 280/728.2 |
| 2009/0072521 A1 | 3/2009 | Jang et al. | |
| 2009/0079173 A1 | 3/2009 | Jang et al. | |
| 2010/0066060 A1* | 3/2010 | Kalandek | 280/728.2 |
| 2010/0156073 A1* | 6/2010 | Rick | 280/730.2 |
| 2011/0042921 A1* | 2/2011 | Kjell et al. | 280/728.2 |
| 2011/0079989 A1* | 4/2011 | Baumgartner | 280/728.2 |
| 2011/0304127 A1* | 12/2011 | Asano | 280/728.2 |
| 2011/0316260 A1* | 12/2011 | Jaconelli et al. | 280/728.2 |

* cited by examiner

ATTACHMENT BRACKET AND FASTENING DEVICE FOR FASTENING AN AIRBAG TO A VEHICLE STRUCTURE

CROSS REFERENCE TO RELATED APPLICATIONS

This application is a 371 U.S. National Stage of International Application No. PCT/EP2010/001002, filed Feb. 18, 2010. This application claims priority to German Patent Application No. 10 2009 011 481.5, filed Mar. 6, 2009, which application is herein expressly incorporated by reference.

FIELD

The invention relates to an attachment bracket and a fastening device for fastening an airbag to a vehicle structure.

BACKGROUND

Nowadays, various airbags are provided in modern vehicles, which airbags are rapidly inflated during an accident and protect the passenger or the pedestrian against hitting the areas of the vehicle structure covered by the airbag or the components covered by the same like steering wheels, backrests etc. In particular airbags covering large-surface areas of the vehicle during an accident like for example side airbags extending from the A-pillar to the C- or D-pillar then have to be fastened to the vehicle structure by straps in order that the airbag, even in the inflated state, is kept in a set position and/or the geometry of the airbag is controlled during the inflation process. The fastening of the straps to the vehicle structure is subject to various legal requirements and additional requirements on the part of the vehicle manufacturer as to the load capacity under various conditions. Moreover, the fastening shall naturally be realized as assembly-friendly and as cost-effective as possible.

From EP 1 502 824 A1, a fastening of an airbag with an attachment bracket is known, in which the attachment bracket is provided with an arcuate tongue stamped out of the surface of the attachment bracket. For fastening the airbag to the vehicle structure, the tongue is inserted from one side into an opening provided at the vehicle structure and with the end of the tongue directed towards the vehicle structure it is inserted into a second opening on the other side of the vehicle structure. Due to the arcuate tongue resting against the other side of the vehicle structure the attachment bracket rests against the vehicle structure with a clamping surface exerting a clamping force. The clamping force therein is determined by the shaping and the spring elasticity of the tongue. In case, a high clamping force shall be achieved, the tongue thus needs to have an accordingly stiff configuration resulting in the disadvantage that relatively great forces have to be applied for mounting the attachment bracket, as the tongue just also has to be elastically deformed during the assembly. A further significant disadvantage of this solution is that a certain skilfulness of the assembler is required for mounting the attachment bracket, as the tongue not only has to be deformed for fastening the attachment bracket, but in addition has to be inserted with big effort into the opening and, subsequently, it has to be fixed with the arcuate end in the opening on the back side of the vehicle structure, which opening is difficult to access.

Therefore, such a fastening can be problematic in particular when manufacturing a vehicle on the assembly line and during an assembly in cramped conditions within the vehicle.

SUMMARY

In light of this, it is the object of the invention to provide an attachment bracket and a fastening device for an airbag, which shall be easy to mount and though shall be mounted on the vehicle structure with a sufficient clamping force.

The solution of the object is provided by an attachment bracket comprising the features of claim 1, a fastening device comprising the features of claim 11 and an airbag comprising the features of claim 13. Preferred developments of the invention can be learned from the sub claims.

For the solution of the object, it is proposed that the attachment bracket is formed from at least a first layer forming the clamping surface and a second layer spaced from the first layer in a spring elastic manner, that the first and the second layer can be located on the same side of the vehicle structure, that the attachment bracket can be fastened to the vehicle structure by a fastening means, that the distance between the first and the second layer can be reduced by fastening the attachment bracket with the fastening means, and that a clamping force acting between the first layer and the vehicle structure can be generated by reducing the distance.

The basic idea of the invention is that the clamping force acting onto the clamping surface is generated by a completely new configuration of the attachment bracket comprising two layers spaced in a spring elastic manner, which layers can be located on the same side of the vehicle structure, and a fastening means reducing the distance between the layers by fastening the attachment bracket. The clamping forces of the attachment bracket are generated by the first and the second layer being pressed together by the fastening means and by the two layers, in this state of being pressed together, being fixed at the vehicle structure via the fastening means. As a result, solely compressive forces are exerted for mounting the attachment bracket, which compressive forces rest on the vehicle structure during the assembly due to the arrangement of the two layers on the same side of the vehicle structure. This results in a significantly easier handling of the attachment bracket, and, besides, significantly greater clamping forces can be generated, as the assembly forces can be applied much easier due to using compressive forces during the assembly without the further need for a skilfulness on the part of the assembler. Furthermore, the attachment bracket itself with one layer needs not to be inserted with big effort into an opening of the vehicle structure and to be fixed on its back side, whereby the mounting of the attachment bracket is further simplified.

It is further proposed that the first and the second layer are formed from one layer folded back upon itself. The attachment bracket can thus be made from one layer, and the two layers can then just be provided by the one layer being folded back upon itself.

A further preferred embodiment of the invention is that the first and the second layer are connected to each other on one side. By connecting the two layers on one side a very simple possibility of generating the spring force acting between both layers is provided. It is important in this case that the connection only is present on one side so that the movability of the two layers towards each other is just not restricted or limited by a further connection point on another side.

It is further proposed that the distance between the first and the second layer increases starting from one side of the attachment bracket in the state of the attachment bracket, in which it is not fastened to the vehicle structure. The proposed alignment of the two layers towards each other allows the two layers to be pulled together and to subsequently rest against each other essentially in parallel in the fastened state, and, as a result, to exert the increased clamping force generated according to the invention onto the vehicle structure with the clamping surface.

In this case, it is further proposed that the distance between the first and the second layer in the state of the attachment bracket, in which it is not fastened to the vehicle structure, is smaller in the area of the opening than in the area of the fastening means. Thereby, the two layers can be pulled towards each other over a longer distance in the area of the fastening means for generating the desired clamping force, whereas the layers in the area of the inserted strap change their position to each other to a significantly lesser extent so that as little slack as possible is introduced into the strap connected to the airbag by the fastening via the attachment bracket.

A constructively simple form of the fastening of the attachment bracket can be seen in that the fastening means is formed from a locking head connected to the attachment bracket via a connecting web, and that the attachment bracket can be fixed at the vehicle structure in a clamp-like manner by inserting the locking head into an opening located at the vehicle structure and by performing a rotational movement.

In this case, it is further proposed that the first as well as the second layer each comprises a locking head connected to the attachment bracket via a connecting web, and that the locking heads can be jointly inserted into the opening in the vehicle structure, and that the locking heads after having been inserted are positioned in such a way that they cause the first and the second layer to be pulled together when performing the rotational movement. The locking heads after having been inserted can for example be positioned with a slight offset in relation to the attachment bracket so that they perform a relative movement to each other during the rotational movement due to the offset and due to them resting against the vehicle structure and pull the layers together. In the ideal case, the locking heads rest congruently and in parallel to each other against the other side of the vehicle structure after the fastening.

Alternatively, it is proposed that an opening is provided at the attachment bracket, into which the fastening means can be inserted, and that the attachment bracket can be fixed at the vehicle structure by the fastening means performing a rotational movement in relation to the attachment bracket. By the proposed solution, the attachment bracket itself needs not to be rotated but solely the fastening means has to be rotated in relation to the attachment bracket. Such a way of fastening lends itself, in case, the attachment bracket has to be located in cramped installation spaces or, in case, it is not possible to rotate the attachment bracket with the strap inserted.

In this case, a locking segment should be provided at the fastening means, which locking segment protects the fastening means against a backward rotational movement after performing the rotational movement in order that the fastening means cannot automatically disengage itself unintentionally from the fastened position.

In order that the attachment bracket itself does not rotate together with the fastening means during rotation it is further proposed that a locking contour is provided at the first layer protecting the attachment bracket against a rotation in relation to the vehicle structure.

Furthermore, for the solution of the object, a fastening device for an airbag comprising an attachment bracket is proposed, in which the fastening means comprises a locking head, which can be inserted into the long hole of the attachment bracket and into the long hole of the vehicle structure, and that the fastening means clamps the vehicle structure between the locking head and the attachment bracket by performing the rotational movement, and thereby fixes the attachment bracket at the vehicle structure.

BRIEF DESCRIPTION OF THE DRAWINGS

In the following, the invention is described in more detail based on various embodiments. The figures show in detail.

DETAILED DESCRIPTION

Figure 1:
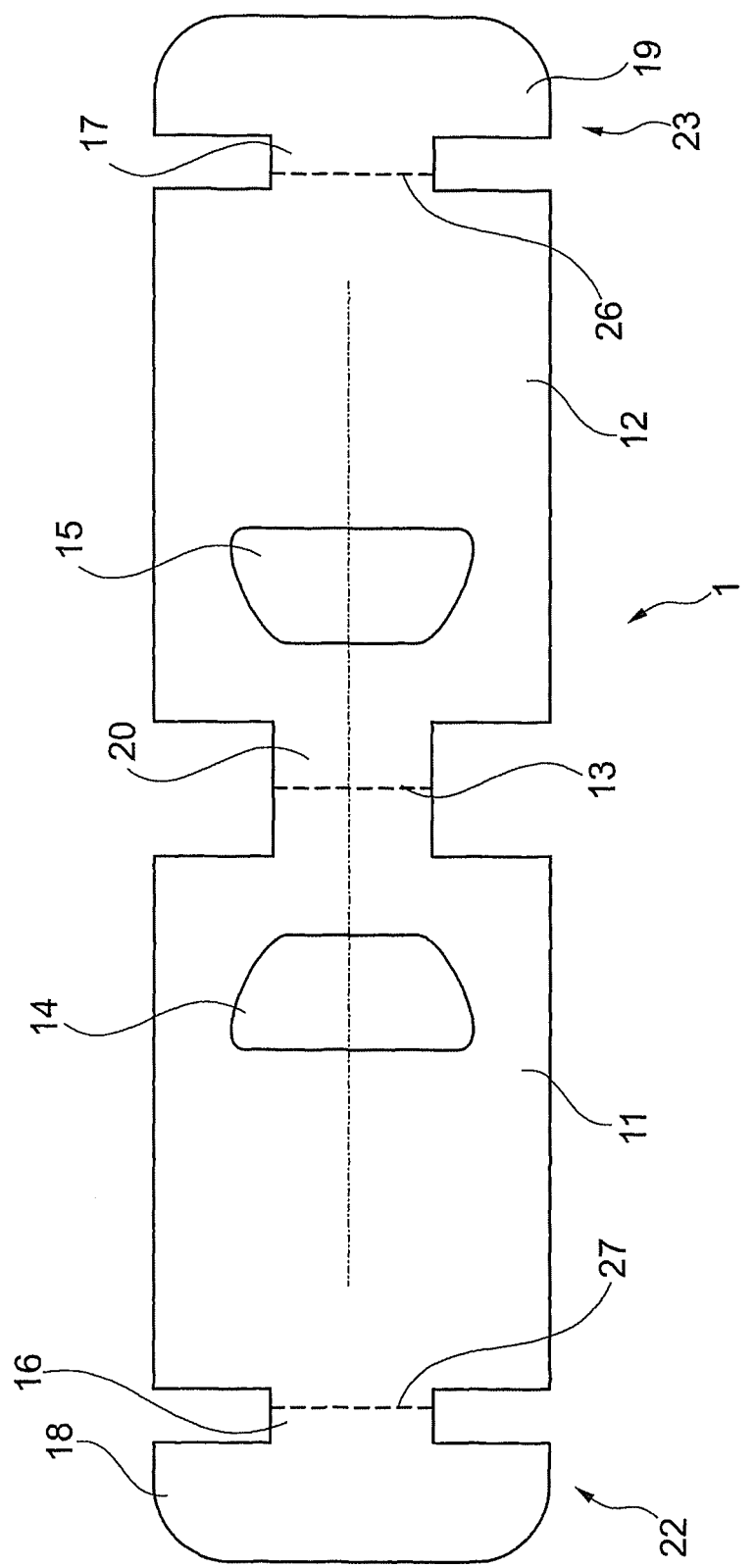
FIG. 1: Attachment bracket with locking heads before folding

FIG. 1 shows an attachment bracket 1 as it is stamped out of a sheet metal as a stamping part. The attachment bracket 1 is formed from a first layer 12 and a second layer 11, which layers are connected to each other via a connecting web 20. Fastening means 22 and 23 are located at the free ends of the layers 11 and 12, which fastening means are formed by locking heads 18 and 19 connected to the layers 11 and 12 via connecting webs 16 and 17. Furthermore, openings 14 and 15 are provided in the layers 11 and 12, which openings comprise an identical geometry and are located symmetrically to a folding line 13 in the connecting web 20. In the state shown in FIG. 1, the attachment bracket 1 has not yet been folded and is formed from one layer only. In order to avoid misunderstandings, the attachment bracket 1 though has already been divided into a first and a second layer 12 and 11.

Figure 2:
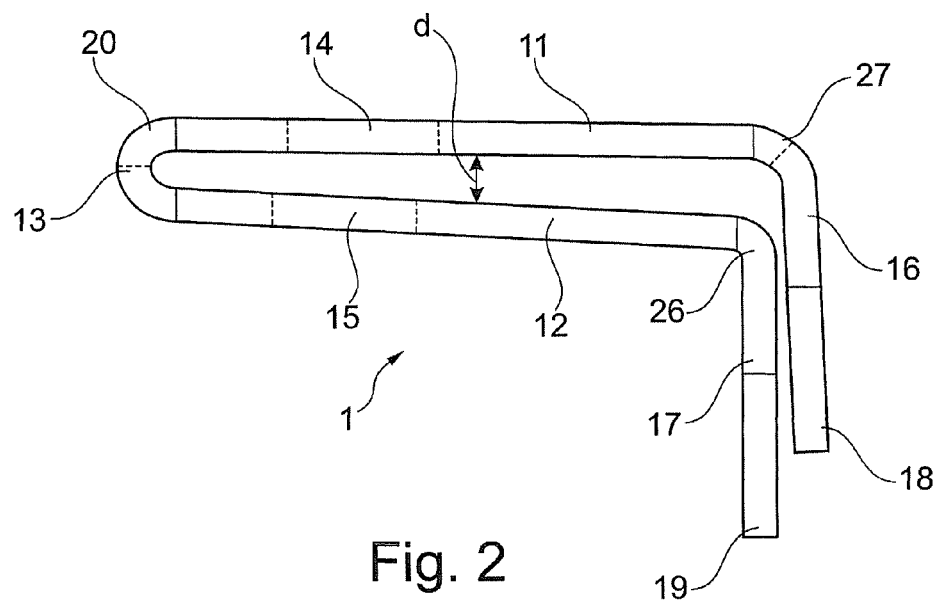
FIG. 2: Side view of attachment bracket with locking heads after folding

FIG. 2 shows the same attachment bracket 1 from FIG. 1 in its folded state. In a first folding step, the first layer 12 and the second layer 11 have been folded at the folding line 13 and have been folded back upon themselves resulting in an overall two-layer attachment bracket 1. Subsequently, the locking heads 18 and 19 have been bent away at the folding lines 27 and 26 by about a right angle to one side of the two-layer attachment bracket 1. Alternatively, the locking heads 18 and 19 can be first bent away at the folding lines 27 and 26, and, subsequently, the first and the second layer 12 and 11 are folded on top of each other. However, in this case it is important that the locking heads 18 and 19 are bent away to different sides of the attachment bracket 1 so that they point to the same direction after folding the layers 11 and 12. As can be clearly seen, the distance "d" between the first and the second layer 12 and 11 increases in the direction of the locking heads 18 and 19 starting from the connecting web 20.

Figure 3:
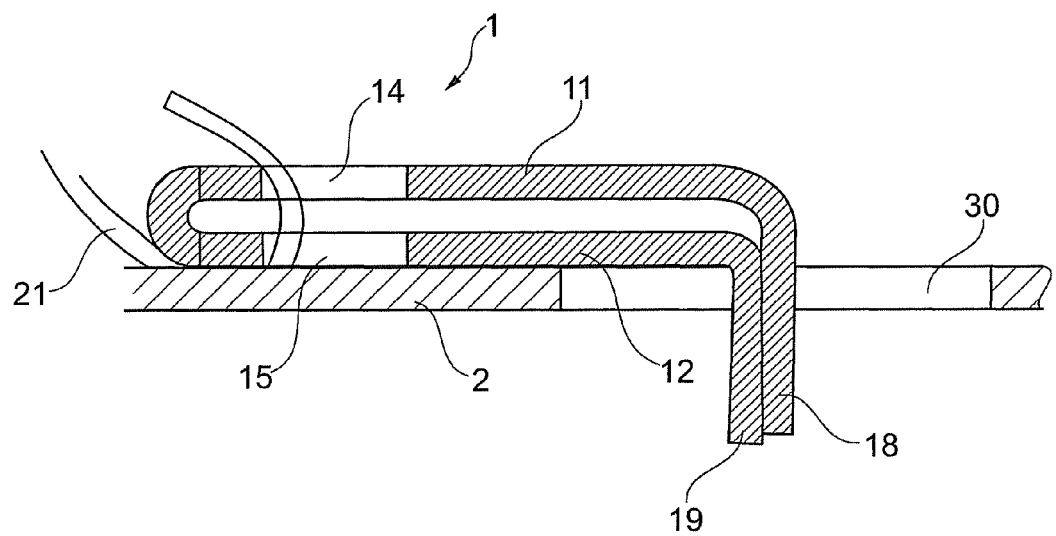
FIG. 3: Cross-sectional view of attachment bracket with locking heads after having been fastened to the vehicle structure

FIG. 3 shows a cross-sectional view of the same attachment bracket 1 from FIG. 1 and FIG. 2 in its fastened position. A strap 21 is guided through the openings 14 and 15, which strap is connected to an airbag (not shown). By folding the first and the second layer on top of each other, the openings 14 and 15 have come to rest congruently on top of each other and, thereby, form a joint opening for the strap 21, wherein also a bigger radius of the contact surface for the strap 21 can be provided by the two layers 11 and 12 resting on top of each other. The locking heads 18 and 19 and the layers 11 and 12 are noticeably pulled towards each other compared with the position shown in FIG. 2 so that a considerably greater spring force is acting between the first layer 12 and the second layer 11, and the first layer 12 is pressed onto the vehicle structure 2 with a clamping force. The clamping force is introduced into the vehicle structure 2 by the locking heads 18 and 19 resting against the other side of the vehicle structure 2 so that the attachment bracket 1 automatically clamps itself to the vehicle structure 2.

Figure 4:
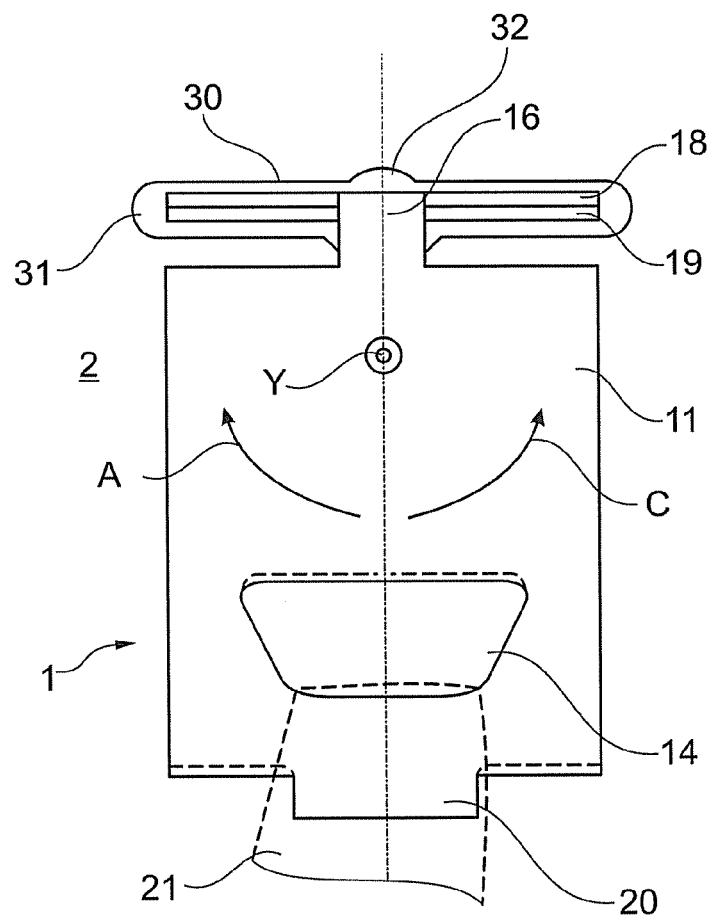
FIG. 4: Top view of attachment bracket with locking heads before rotating
Figure 5:
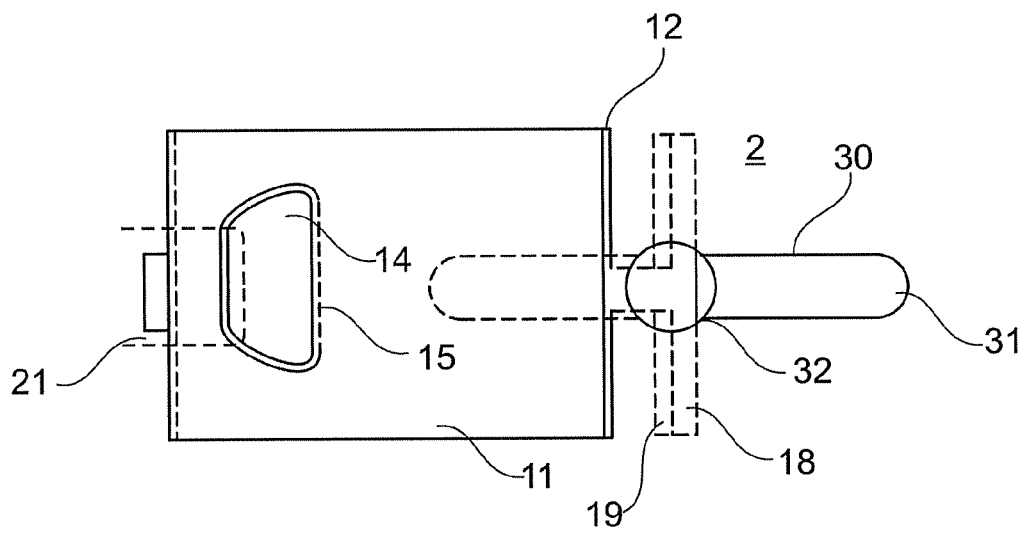
FIG. 5: Top view of attachment bracket with locking heads after rotating

FIGS. 4 and 5 show the attachment bracket 1 from FIG. 3 before and after having been fastened to the vehicle structure 2. First, the attachment bracket 1 is inserted into an opening 30 in the vehicle structure 2 with the locking heads 18 and 19. The opening 30 is formed from a long hole 31 comprising a central circle segment 32. For being fastened, the attachment bracket 1 is rotated by approximately 90 degrees in the arrow direction "A" or "C" with respect to an imagined axis "Y" perpendicular to the bracket 1 to the position shown in FIG. 5. As a result, the locking heads 18 and 19 get to rest against the side of the vehicle structure 2 turning away from the attachment bracket 1. In order to allow the rotation of the attachment bracket 1, the layers 11 and 12 are pressed together, wherein the process of pulling the layers 11 and 12 together may be supported by the locking heads 18 and 19 and/or the surfaces of the vehicle structure 2 crossed thereby being provided with corresponding bevels effecting a relative movement of at least one of the locking heads 18 and 19 perpendicular to the vehicle structure 2 during the rotational movement. However, the first and the second layer 12 and 11 can also be pressed together solely by manually exerting pressure onto the second layer 11. After rotating the attachment bracket 1, the vehicle structure 2 is clamped between the clamping surface formed by the first layer 12 and the locking heads 18 and 19. As for fastening the attachment bracket 1, besides the simple process of inserting the locking heads 18 and 19, solely compressive forces have to be exerted onto the second layer 11 of the attachment bracket 1, the assembly process is much easier to carry out, and due to the easier handling significantly greater clamping forces can be realized.

Figure 6:
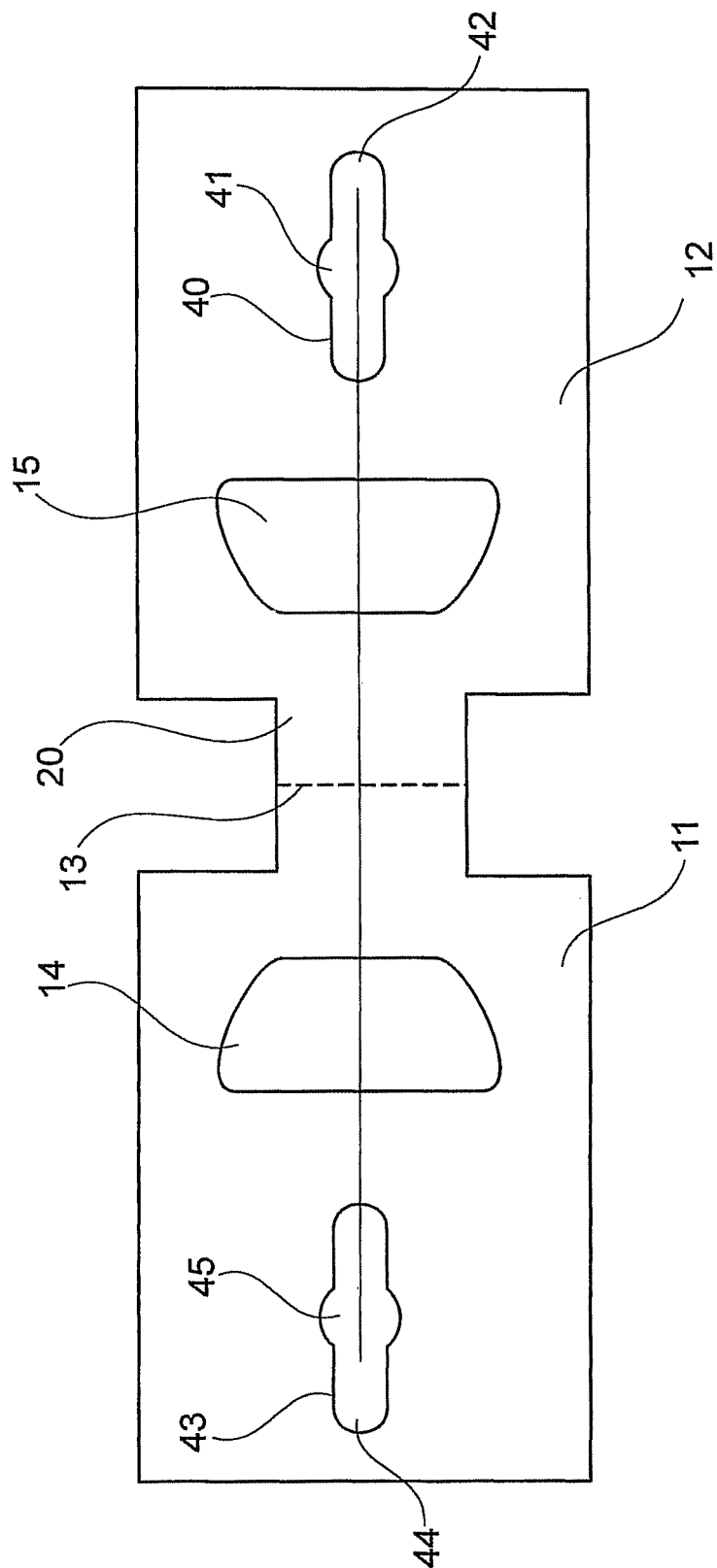
FIG. 6: Attachment bracket with openings before folding

FIG. 6 shows an alternative embodiment of the invention, in which the attachment bracket 1 is formed by a first layer 12 and a second layer 11 connected to the first layer 12 via a connecting web 20, and in which openings 14 and 15 are provided in the surface of the layers 11 and 12 for inserting the strap 21, as it is also the case in the embodiment shown in FIG. 1. Additionally, openings 40 and 43 are provided in the layers 11 and 12. The openings 40 and 43 are formed in a geometrically identical manner by a long hole 44 and 42 respectively, each comprising a central circle segment 45 and 41. The attachment bracket 1 from FIG. 6 during its manufacture before folding is formed from only one layer, which though here has reasonably already been divided into a first and a second layer 12 and 11. The layers 11 and 12 are then folded on top of each other to a two-layer attachment bracket 1 at the folding line 13, as it can be seen in FIG. 7 in a cross-sectional view. The openings 14, 15, 40 and 43 therein are located in the layers 11 and 12 in such a way that they come to rest congruently on top of each other in the folded state.

Figure 7:
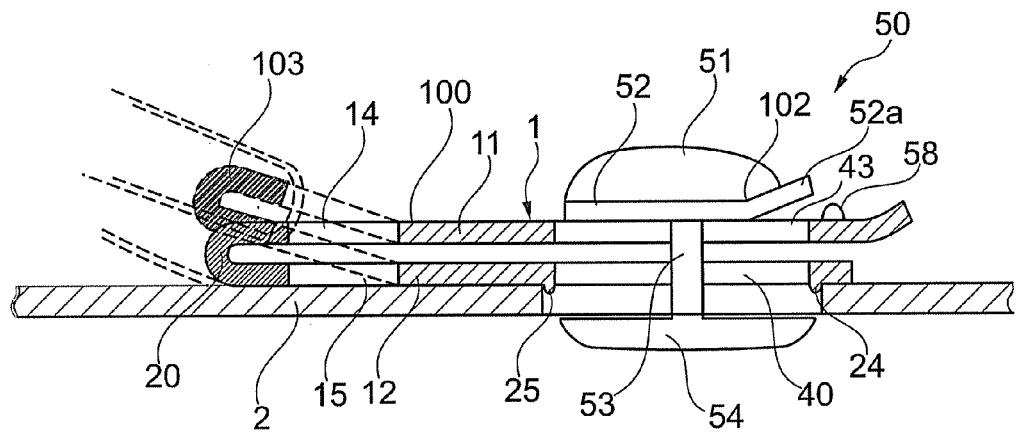
FIG. 7: Cross-sectional view of attachment bracket with openings and fastening means inserted before rotating
Figure 8:
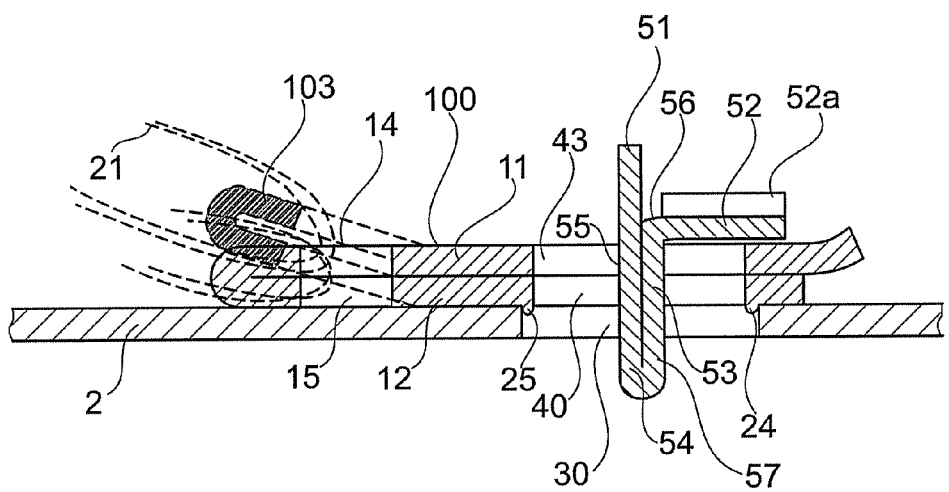
FIG. 8: Cross-sectional view of attachment bracket with openings and fastening means inserted after rotating
Figure 11:
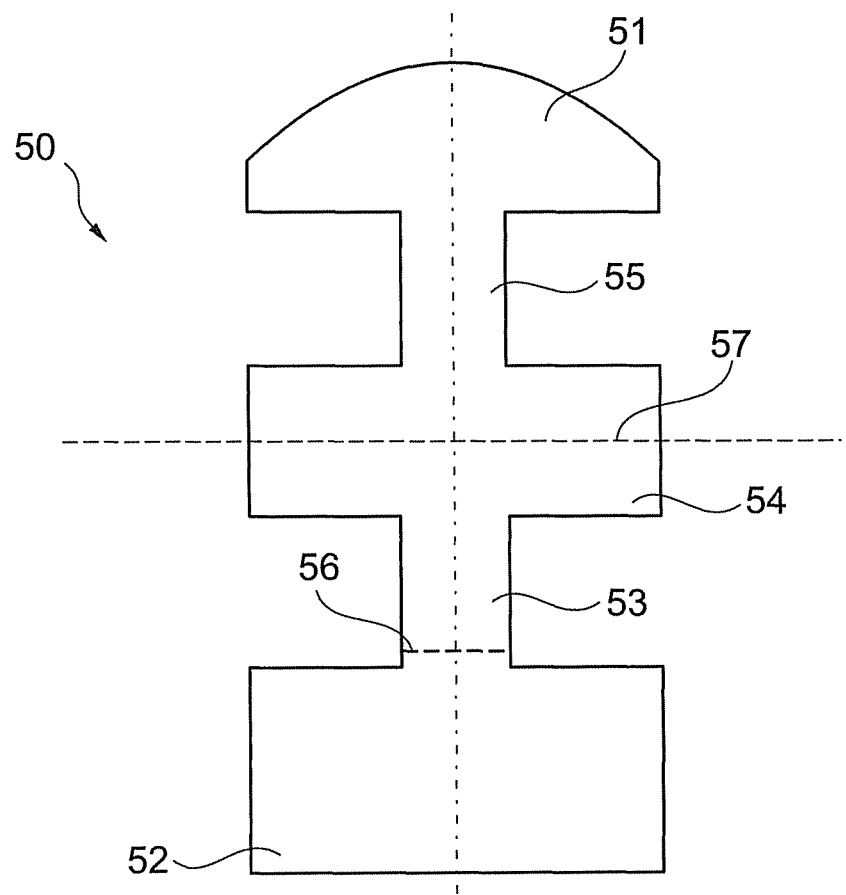
FIG. 11: Fastening means to be inserted into the opening of the attachment bracket before folding

FIGS. 7 and 8 show the attachment bracket 1 in the folded state at the vehicle structure 2. A locking contour 24 and 25 is provided at the first layer 12 facing the vehicle structure 2, which locking contour is formed by two projections extending into the opening 30 of the vehicle structure 2, and which locking contour protects the attachment bracket 1 against rotating in relation to the vehicle structure 2. After arranging the attachment bracket 1 at the vehicle structure 2 a fastening means 50 is inserted into the openings 40, 43 and 30 resting on top of each other. The fastening means 50 comprises an actuating segment 51 and a locking head 54 connected to the actuating segment 51 via a connecting web 55. The length of the connecting web 55 is dimensioned in such a way that the fastening means 50 after having been inserted is located above the attachment bracket 1 with the actuating segment 51 and is located on the side of the vehicle structure 2 turning away from the attachment bracket 1 with the locking head 54. As can be seen in FIG. 11, the fastening means 50 is formed from a flat element, like for example a stamping part, and its configuration can be divided into the actuating segment 51, the locking head 54 and a locking segment 52, which are connected to each other via connecting webs 53 and 55 respectively. The fastening means 50 is folded at a folding line 57 in a first step so that the locking segment 52 comes to rest approximately on the actuating segment 51. Subsequently, the locking segment 52 is bent backwards at a folding line 56 so that the same sticks out at about a right angle from the fastening means 50. FIG. 8 shows a cross-sectional view of the form of the fastening means 50 after folding.

Another preferred embodiment of the invention can be seen in bending a part 103 at a folding line 100 with respect to the relative mounting position to the vehicle structure 2 in an upward direction as shown in the FIGS. 7 to 10. Therefore, the part 103 provides a distance between the vehicle structure 2 and the bracket 1, which distance prevents the inserted strap 21 from being clamped between the vehicle structure 2 and the bracket 1.

Figure 10:
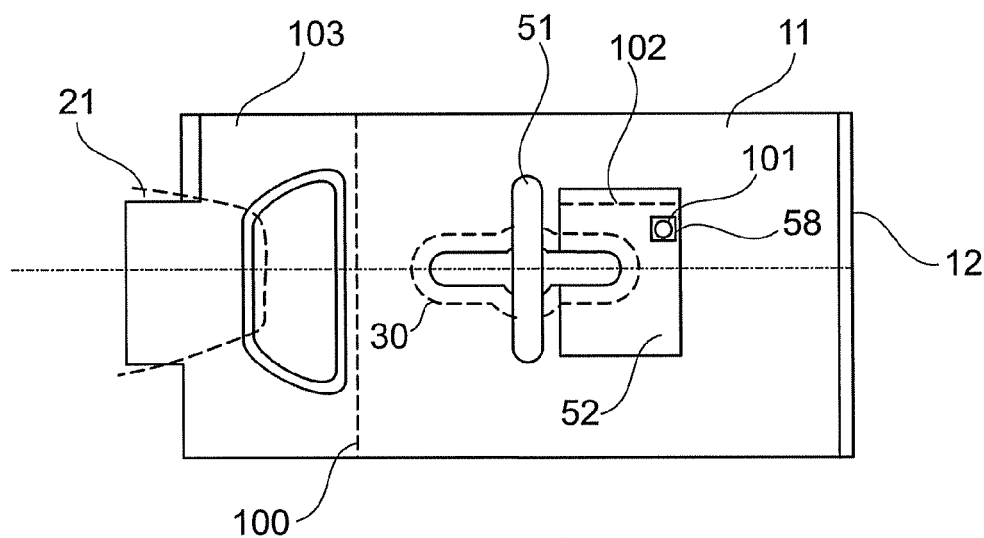
FIG. 10: Top view of attachment bracket with openings and fastening means inserted after rotating

Due to the locking segment 52 being bent away, the same acts as a dog at the attachment bracket 1 during the insertion movement of the fastening means 50 so that the fastening means 50 cannot be inserted into the openings 40, 43, 30 farther than to the position shown in FIG. 7. For fastening the attachment bracket 1 the fastening means 50 is rotated out of the position shown in FIG. 7. A locking projection 58 is provided on the free upper surface of the second layer 11, with which locking projection the fastening means 50 engages with the locking segment 52 so that the fastening means 50 cannot automatically rotate back after rotating to the fastened position. The locking segment 52 is provided with an opening 101 and a part 52a bent upwards at a folding line 102 as shown in the FIG. 7. When turning the fastening means 50, the locking segment 52 is moved over the locking projection 58 with the part 52a, until the locking projection 58 finally engages into the opening 101 as shown in FIG. 10. The bent part 52a enables the rotational movement by abutting the locking projection 58 at the top and lifting the locking segment 52 in a resilient manner for a short time during the movement until the locking projection 58 engages into the opening 101.

Figure 9:
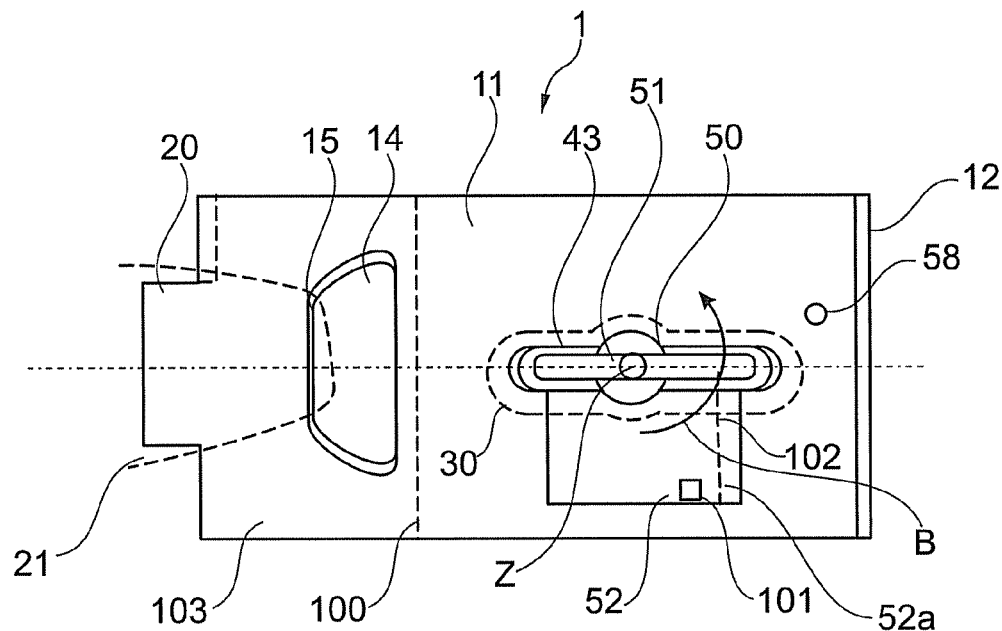
FIG. 9: Top view of attachment bracket with openings and fastening means inserted before rotating

FIGS. 9 and 10 show the fastening process with a top view of the fastening means 50. The fastening means 50 is inserted into the openings 43 and 40 resting on top of each other and into the hinted opening 30 in the vehicle structure 2 with the non-visible locking head 54 aligned with the actuating segment 51. When the fastening means 50 is rotated in the arrow direction "B" with respect to an imagined axis "Z" perpendicular to the bracket 1 out of the position shown in FIG. 9, which corresponds to the cross-sectional view shown in FIG. 7, the fastening means 50 with the attachment bracket 1 fixed comes to a position with the locking head 54, in which position the locking head 54 gets to rest against the side of the vehicle structure 2 turning away from the attachment bracket 1. In order to allow the rotation, the first and the second layer 12 and 11 of the attachment bracket 1 are then pressed together. The layers 11 and 12 can therein be pressed together merely manually via the fastening means 50 and/or they can be pressed together in a way supported by corresponding bevels at the vehicle structure 2 and/or at the actuating segment 51 or the locking head 54. In the fastened position, the vehicle structure 2 and the attachment bracket 1 are then clamped between the actuating segment 51 and the locking head 54, wherein the layers 11 and 12 then are pressed together at the same time reducing the width of the gap present between the two layers 11 and 12, and wherein the clamping force exerted onto the vehicle structure 2 by the first layer 12 is increased. A substantial advantage of the embodiment shown in FIGS. 6 to 11 is that the attachment bracket 1 itself needs not to be rotated. For fastening the attachment bracket 1 solely the fastening means 50 has to be inserted and rotated, like everybody does everyday for example when locking or unlocking a door. A particular skilfulness is not required for that. The assembly force to be applied then solely consists of a compressive force to be summoned up via the fastening means 50, which compressive force rests on the vehicle structure 2 and is required for pressing the first and the second layer 12 and 11 together.

After rotating the fastening means 50 or the fastening means 22 and 23, the attachment bracket 1 can further be moved to a position within the opening 30 in the vehicle structure 2, in which position a possible force introduced by the strap 21 can be better transmitted to the vehicle structure 2, and/or in which position the same is protected against unintentionally slipping out of the opening 30.

The invention claimed is:

1. A fastening device for securing an airbag to a vehicle structure, the fastening device comprising:
   an attachment bracket including an opening for receiving a strap connected to the airbag and a clamping surface for resting against the vehicle structure, the attachment bracket formed from at least a first layer forming the clamping surface and a second layer spaced from the first layer in a spring elastic manner, the first layer and the second layer located on a common side of the vehicle structure; and
   a fastening mechanism for fastening the attachment bracket to the vehicle structure, the fastening mechanism bent from a flat member to define first and second parallel layers connected at a first fold line and to include a first end for passing through a bracket opening of the attachment bracket and an opening in the vehicle structure, the fastening mechanism further including a second end proximate an upper side of the attachment bracket.

2. The fastening device of claim 1, wherein the fastening mechanism includes an actuating segment, a locking head and a locking segment, the locking segment and the locking head connected by a first reduced width web, the actuating segment and the locking head connected by a second reduced width web.

3. The fastening device of claim 2, wherein the fastening mechanism is folded at a second fold line to orient the locking segment perpendicular to the actuating segment and parallel to and adjacent to an upper side of the attachment bracket.

4. The fastening device of claim 2, wherein the first and second reduced width webs are adjacent to and parallel to one another.

5. A fastening device for securing an airbag to a vehicle structure, the fastening device comprising:
   an attachment bracket including an opening for receiving a strap connected to the airbag and a clamping surface for resting against the vehicle structure, the attachment bracket formed from at least a first layer forming the clamping surface and a second layer spaced from the first layer in a spring elastic manner, the first layer and the second layer located on a same side of the vehicle structure; and
   a fastening mechanism for fastening the attachment bracket to the vehicle structure such that a distance between the first layer and the second layer is reducible by fastening the attachment bracket with the fastening mechanism, and a clamping force acting between the first layer and the vehicle structure is generated by reducing the distance the fastening mechanism bent from a flat member to include a locking head insertable into a bracket opening of the attachment bracket and into an opening of the vehicle structure, the fastening mechanism operative to fasten the attachment bracket to the vehicle structure by clamping the vehicle structure between the locking head and the attachment bracket through rotational movement of the fastening mechanism.

6. The fastening device according to claim 5, wherein the first layer and the second layer of the attachment bracket are formed from one layer folded back upon itself.

7. The fastening device according to claim 5, wherein the first layer and the second layer of the attachment bracket are connected to each other on one side.

8. The fastening device according to claim 5, further comprising a locking segment at the fastening mechanism, wherein the locking segment protects the fastening mechanism against a backward rotational movement after performing the rotational movement.

9. The fastening device according to claim 5, further comprising a locking contour at the first layer protecting the attachment bracket against rotating in relation to the vehicle structure.

10. The fastening device according to claim 5, wherein the opening in the vehicle structure is formed as a long hole, and the attachment bracket is located in the long hole in a longitudinally displaceable manner.

11. The fastening device of claim 5, in combination with an airbag.

12. The fastening device of claim 5, wherein the fastening mechanism is monolithically formed from the flat member.

13. The fastening device according to claim 5, wherein the distance between the first layer and the second layer in a state of the attachment bracket, in which it is not fastened to the vehicle structure, increases starting from one side of the attachment bracket.

14. The fastening device according to claim 13, wherein the distance between the first layer and the second layer in the state of the attachment bracket, in which it is not fastened to the vehicle structure, is smaller in an area of the opening for receiving the strap than in an area of the fastening mechanism.

15. The fastening device of claim 5, wherein the fastening mechanism includes an actuating segment, the locking head and a locking segment, the locking segment and the locking head connected by a first reduced width web, the actuating segment and the locking segment connected by a second reduced width web.

16. The fastening device of claim 15, wherein the fastening mechanism is folded at a first fold line passing through the locking head such that the first and second reduced width webs are parallel to and adjacent one another.

17. The fastening device of claim 16, wherein the locking segment is folded at a second fold line to orient the locking segment perpendicular to the actuating segment.

18. An attachment bracket for fastening an airbag to a vehicle structure comprising:
  an opening for receiving a strap connected to the airbag; and
  a clamping surface for resting against the vehicle structure;
  wherein the attachment bracket is formed from at least a first layer forming the clamping surface and a second layer spaced from the first layer in a spring elastic manner, the first and the second layer located on a common side of the vehicle structure, the attachment bracket adapted to be fastened to the vehicle structure by a fastening mechanism, a distance between the first layer and the second layer reducible by fastening the attachment bracket with the fastening mechanism, and a clamping force acting between the first layer and the vehicle structure is generated by reducing the distance;
  wherein the fastening mechanism is formed from a locking head connected to the attachment bracket via a connecting web, and that the attachment bracket can be fixed in a clamping manner at the vehicle structure by inserting the locking head into an opening located in the vehicle structure, and by performing a rotational movement; and
  wherein the first layer as well as the second layer each comprises a locking head connected to the attachment bracket via a connecting web, and that the locking heads can be jointly inserted into the opening in the vehicle structure, and that the locking heads after having been inserted into the opening are positioned so as to cause the first layer and the second layer to be pulled together when performing the rotational movement.

* * * * *